United States Patent [19]

Mathews

[11] 4,180,014
[45] Dec. 25, 1979

[54] ANIMAL FEEDER

[76] Inventor: Donald C. Mathews, Rte. 1, Box 32 F, Newman Lake, Wash. 99025

[21] Appl. No.: 814,484

[22] Filed: Jul. 11, 1977

[51] Int. Cl.² .................. A01K 5/01; A01K 39/014
[52] U.S. Cl. ................................. 119/52 R; 222/457
[58] Field of Search ............... 119/18, 52 R; 222/457; 229/17 B

[56] References Cited

U.S. PATENT DOCUMENTS

| 3,584,768 | 6/1971 | Ascough et al. | 229/17 B |
|---|---|---|---|
| 3,776,190 | 12/1973 | Hurlbert | 119/18 |

FOREIGN PATENT DOCUMENTS 962939  6/1950  France ..................... 222/457

Primary Examiner—Louis G. Mancene
Assistant Examiner—Robert P. Swiatek
Attorney, Agent, or Firm—Wells, St. John & Roberts

[57] ABSTRACT

An animal feeder having an upwardly open feeding trough at the lower end of a storage hopper. The hopper includes an upright front wall leading to the rear of the trough, a rearwardly spaced back wall, and an inclined wall leading downward and forwardly from the back wall to the trough. The feeder is constructed from two planar sheets of bendable stiff material, such as sheet metal. Each sheet has fold lines enabling it to be bent to the feeder configuration. Complementary tabs and slots are used to secure the two sheets to one another to complete the feeder.

6 Claims, 4 Drawing Figures

ANIMAL FEEDER

BACKGROUND OF THE INVENTION

This disclosure relates to a feeder for small animals, poultry or birds. It is made of sheet metal or other suitable sheet material and is assembled from two pieces. It is designed to be shipped in sheet form, and is adapted to be readily folded and assembled by the ultimate user with no special tools, skills or detailed directions being required. Should one portion of the feeder be damaged, it can be replaced without replacing the entire structure. Since it is adapted to be shipped in sheet form, it can be handled very economically. Its cost is minimized by the fact that final fabrication is accomplished by the ultimate user.

DESCRIPTION OF THE PREFERRED EMBODIMENT

Figure 1:
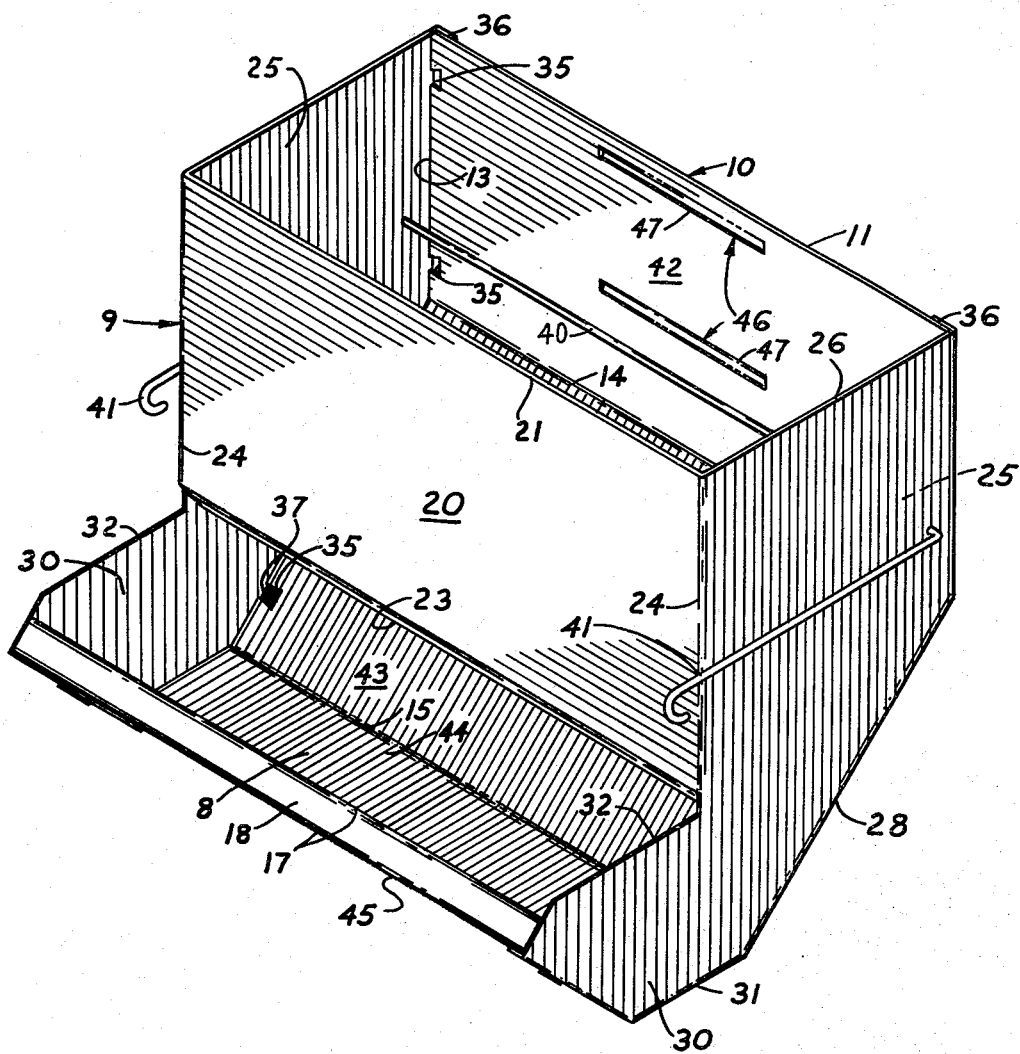
FIG. 1 is a perspective view of the assembled feeder.

This disclosure relates to an animal feeder, which is shown assembled in FIG. 1. The feeder includes a forwardly directed transverse trough, generally designated by the reference numeral 8. The trough 8 is supplied with feed material from an upwardly directed storage hopper designated at 9. Feed material is inserted into the storage hopper 9 through its open top section, and is directed by gravity to the interior of trough 8, where it is accessible by animals, poultry or birds using the apparatus.

A hanger member rod 40 can be provided if desired, being illustrated with perpendicular hooked extensions 41 at each end to permit mounting of the feeder to wire cages. The hanger is pivoted freely in apertures near the back wall of the feeder. Thus the hooks can be pivoted forwardly as shown to allow the feeder to be mounted to the outside of a cage, or they can be pivoted rearwardly to allow the feeder to be mounted within a cage. Of course the feeder may also be mounted to surfaces other than wire cage screens and the hanger members are well adapted (being bendable) to assist in mounting the feeder to any appropriate upright support structure.

The feeder is constructed from two sheets of material. The first sheet of material is shown in detail in FIG. 2 and the second is shown in FIG. 3. Each can be cut or formed from a sheet of suitable metal material or other adaptable stiff sheet material, the choice of material being dependent upon the type of feed being utilized and the type of animals or birds for which the feeder is designed. Metal is preferable because of its durability and resistance to chewing or destruction by the animals.

Figure 2:
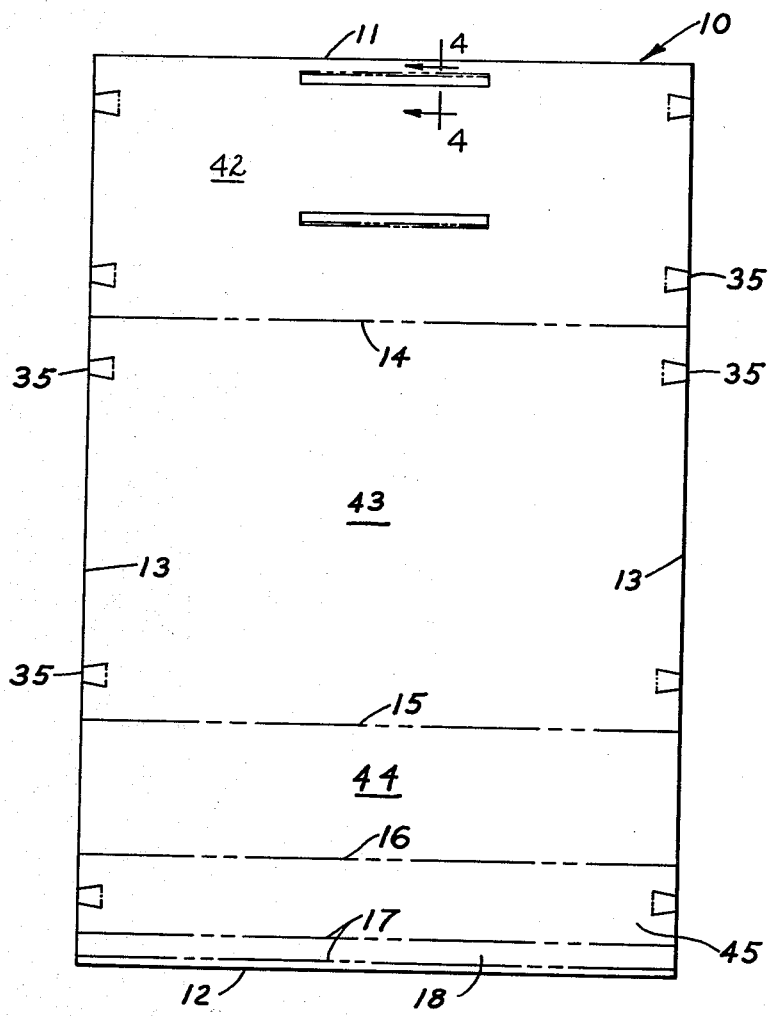
FIG. 2 is a plan view of a first component of the unassembled feeder.
Figure 3:
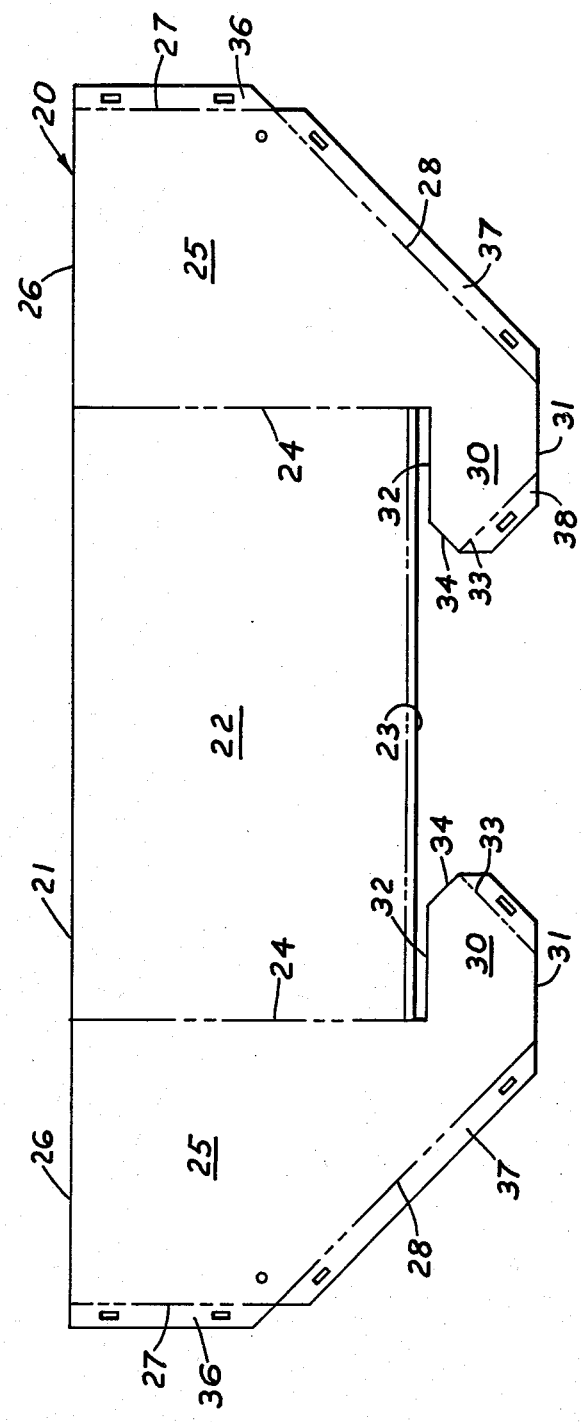
FIG. 3 is a plan view of a second component of the unassembled feeder.

The first sheet of material 10 has an upright rectangular configuration in the orientation shown in FIG. 2. It has a top transverse edge 11, a lower transverse edge 12 and parallel upright side edges 13, which together present a rectangular configuration.

A plurality of fold lines are formed transversely across sheet 10. Each is parallel to the top and lower edges 11, 12. A first fold line is indicated at 14. A second fold line is indicated at 15. A third fold line is indicated at 16. When folded, the sheet 10 defines an upright back wall 42 between the top transverse edge 11 and the first fold line 14, and inclined wall 43 between the first fold line 14 and the second fold line 15, and a bottom wall 44 between the second fold line 15 and the third fold line 16. Finally, an upright front wall 45 is defined between the third fold line 16 and the lower transverse edge 12 across sheet 10. A transverse lip 18 is folded at 17 and extends across the edge 12 for reinforcement and presents a smooth folded surface across the front of trough 8 to prevent any damage to portions of the animals or birds which might rub against it.

Figure 4:
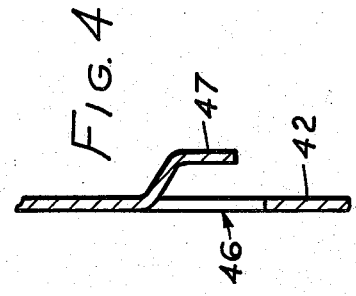
FIG. 4 is an enlarged fragmentary sectional view taken along line 4—4 in FIG. 2.

FIGS. 1, 2 and 4 show a card holder 46 formed integrally with the back wall 42. Holder 46 is defined by parallel opposed slots 47. These slots 47 that have been punched out in this manner will take the cross-sectional form as shown in FIG. 4. A card may be inserted between the slots 47 to indicate the type of feed being used to designate a particular animal for which the feed is intended, etc.

The second sheet of material, generally indicated at 20, is shown in FIG. 3. It is constructed of the same bendable stiff material used in the production of sheet 10. It includes an upper transverse edge 21 extending across its full width. Sheet 20 comprises a central rectangular portion bounded by the edge 21, as well as by a parallel bottom edge 23 and a pair of upright parallel fold lines 24. The fold lines 24 are spaced transversely apart by a distance equal to the spacing of the side edges 13 of the first sheet of material 10.

The second sheet 20 presents symmetrical side portions 25 joined to the central rectangular portion 22 along the upright fold lines 24. These side portions 25 are bounded further by outer extensions of the upper transverse edge 21, as indicated at 26. The side portions 25 terminate along upright side edges 27 which lead respectively from the extensions 26 a distance equal to the separation between the top transverse edge 11 and the first fold line 14 on sheet 10. The side portions 25 are completed by angularly inclined side edges 28 leading inward from the lower end of the respective side edges 27 a distance equal to the separation of the first and second fold lines 14, 15 of sheet 10.

The height from the upper edge 21 of second sheet 20 to the lower end of the angularly inclined side edges 28 is greater than the height of the upright fold lines 24 bounding the central rectangular portion 22.

The lower sections of each side portion 25 present inwardly directed projections 30 integral therewith and bounded by lower edges 31, top edges 32 and an upright edge configuration shown in two sections 33, 34. The lower edges 31 are parallel to the upper transverse edge 21 of the second sheet 20. They are directed inwardly from the lower ends of the angularly inclined side edges 28 a distance equal to the separation of the second and third fold lines 15, 16 of sheet 10. The top edges 32 are parallel to and spaced slightly below the bottom edge 23 of the central rectangular portion 22 of sheet 20. The upright edge configuration presented by sections 33, 34 join the inner ends of the lower edges 31 and top edges 32 across each inwardly directed projection 30. The length along the combined upright edge configuration at 33, 34 is equal to the separation of the third fold line 16 and lower transverse edge 12 of sheet 10.

Means is provided along the side edge 13 of the first sheet 10 for securing the folded first sheet 10 to the folded second sheet 20 in the feeder configuration shown in FIG. 1 by operatively engaging the respective side edges 27, angularly inclined side edges 28 and upright edge configurations 33, 34 of sheet 20. This fastening arrangement is illustrated by means of tabs 35 along the side edges 13 of sheet 10 and complementary flaps 36, 37 and 38 along the respective side edges 27, 28 and the lower section 33 of the upright edge configuration on sheet 20. The flaps 36 are slotted to receive the individual tabs 35, which are then bent to fold back across the flaps 36 and securely fasten the two sheets 10, 20 to one another.

The completed feeder, as shown in FIG. 1, presents an upwardly open feeding trough defined by the bottom wall 44, which has a transverse front edge along the third fold line 16 and a transverse rear edge along the second fold line 15. The curved upright front wall 45 is joined to the bottom wall 44 along the third fold line 16. The trough 8 is completed by parallel side walls; specifically the inwardly directed projections 30 formed from sheet 20. The projections 30 and the upright front wall 45 terminate along open edges located in a common lower plane mounting the feeding area across the width of trough 8.

The storage hopper 9 is in open communication with the interior of the trough 8. The hopper 9 is defined by an upright front wall comprising the central rectangular portion 22 of sheet 20. This front wall leads downwardly to the rear of the feeding trough 8 and terminates along open bottom edge 23, which is elevated slightly above the common plane bounding the trough 8. The edge 23 is spaced upwardly from the bottom wall 44 to permit passage of feed from the hopper 9 to the trough 8. The hopper is completed by the rearwardly spaced upright back wall 42 and the transverse inclined wall 43 which leads downwardly and forwardly from the fold line 14 on sheet 10. The front wall of the hopper, the back wall 42 and the inclined wall 43 are joined along the edges of the side walls presented by the portions 25 of sheet 20. These walls define open upper edges along a common upper plane across the top of the feeder, which is adapted to receive bulk feed material.

The feeder is structurally simple, yet folded and joined in such a manner as to have structural integrity and strength when attached to a supporting wall or resting on a floor surface. Feed material within the assembled device is fed gravitationally from the hopper 9 to the trough 8, where it is accessible by the animals or birds. The device can be constructed economically and can be shipped at minimum cost, since it can be produced and handled in sheet form until assembled by the ultimate user. Assembling the device requires no special training or tools, and, when necessary, the device can be disassembled or partially replaced if one section of a feeder becomes damaged in use.

Having described my invention, I claim:

1. A kit for production of a folded feeder for animals, comprising:
a first planar sheet of bendable stiff material having:
an upright rectangular configuration with a top transverse edge;
a lower transverse edge; and parallel upright side edges joining the top transverse edge and the lower transverse edge;
said first planar sheet having a plurality of transverse fold lines thereon joining the upright side edges and each being parallel to the top and lower edges thereof and defining, when folded:
an upright back wall between the top transverse edge and a first fold line;
an inclined wall between the first fold line and a second fold line;
a bottom wall between the second fold line and a third fold line;
an upright front wall between the third fold line and the lower transverse edge;
a second planar sheet of bendable stiff material having an upright configuration with an upper transverse edge;
said second sheet having a central rectangular portion bounded by the upper transverse edge thereof, a parallel bottom edge and a pair of upright parallel fold lines spaced transversely a distance equal to the spacings of the side edges of said first sheet;
said second planar sheet having symmetrical side portions joined to said central portion along the respective upright fold lines and bounded further by outer extensions of the upper transverse edge of the second sheet and by upright side edges leading from the extensions of said upper transverse edge a distance equal to the complementary distance between the top transverse edge and first fold line of said first sheet, and by angularly inclined side edges leading inwardly from lower ends of its upright side edges a distance equal to the separation of the first and second fold lines of said first sheet;
the height of said second sheet from the upper edge thereof to lower ends of the angularly inclined side edges being greater than the height of the upright fold lines bounding its central rectangular portion;
each side portion of said second sheet presenting inwardly-directed projections integral therewith and bounded by lower edges parallel to the upper transverse edge of said second sheet, said lower edges being directed inwardly from lower ends of the angularly inclined side edges a distance equal to the separation of the second and third fold lines of said first sheet;
top edges of said projections being parallel to and spaced slightly below the bottom edge of the central portion of said second sheet;
and upright edge configurations joining inner ends of said lower edges and top edges across each projection, the length along each upright edge configuration being equal to the separation of the third fold line and lower transverse edge of the first sheet;
and means along the side edges of said first sheet for operative engagement by the respective side edges, angularly inclined side edges and upright edge configurations of said second sheet for securing the folded first sheet to the folded second sheet in an upwardly open feeder configuration having a lower transverse feeding trough and an upright storage hopper leading thereto.

2. The kit defined by claim 1 wherein the upright back wall includes a card holder formed of spaced parallel card receiving slots, said slots being parallel to the top transverse edge.

3. The feeder kit defined by claim 1 further comprising a wire hanger member mountable through apertures formed in the side portions of the second sheet adjacent the upright side edges leading from the extensions of the upper transverse edge.

4. A feeder for animals, comprising:
an upwardly open feeding trough defined by a bottom wall having transverse front and rear edges, an upright front wall joined to the bottom wall along said front edge, and parallel side walls each having a lower projecting portion joining said bottom wall and front wall, the lower projecting portions of the side walls and the upright front wall terminating along open edges located in a common lower plane, bounding a feeding area across the trough;

an upwardly open storage hopper in communication with the trough, the hopper being defined by an upright hopper front wall leading downwardly to the rear of the feeding trough and terminating along an open bottom edge slightly above said common plane bounding the feeding trough and spaced from the bottom wall, a rearwardly spaced upright back wall having a lower transverse edge, and transverse inclined wall leading downwardly and forwardly from the lower transverse edge of the back wall to the rear edge of the bottom wall;

said upright front wall, upright back wall and inclined wall being joined to said side walls at the respective side edges thereof;

said upright front wall, upright back wall and side walls defining open upper edges along a common upper plane, for receiving feed material;

wherein the upright hopper front wall and the side walls of the hopper and feeding trough are integral, being formed of a single first sheet of bendable stiff material;

wherein the upright front wall of the trough, the bottom wall, upright back wall of the hopper and the inclined wall are integral, being formed of a single second sheet of bendable stiff material; and means for securing the first sheet to the second sheet to form the hopper and feeding trough.

5. The feeder as defined by claim 4 wherein the upright back wall includes a card holder formed of spaced parallel card receiving slots, said slots being parallel to the upper edges of the front and back walls.

6. The feeder as defined by claim 4 further comprising a wire hanger member mounted to the side walls through apertures formed through the side walls at locations adjacent the back wall.

* * * * *